United States Patent
McGrath et al.

(10) Patent No.: US 6,638,885 B1
(45) Date of Patent: Oct. 28, 2003

(54) LYOTROPIC LIQUID CRYSTALLINE $L_3$ PHASE SILICATED NANOPOROUS MONOLITHIC COMPOSITES AND THEIR PRODUCTION

(75) Inventors: Kathryn M. McGrath, Princeton, NJ (US); Daniel M. Dabbs, Princeton, NJ (US); Ilhan A. Aksay, Princeton, NJ (US); Sol M. Gruner, Ithaca, NY (US)

(73) Assignee: The Trustees of Princeton University, Princeton, NJ (US)

( * ) Notice: Subject to any disclaimer, the term of this patent is extended or adjusted under 35 U.S.C. 154(b) by 0 days.

(21) Appl. No.: 09/424,029

(22) PCT Filed: May 20, 1998

(86) PCT No.: PCT/US98/10334

§ 371 (c)(1),
(2), (4) Date: Apr. 3, 2000

(87) PCT Pub. No.: WO98/52869

PCT Pub. Date: Nov. 26, 1998

Related U.S. Application Data

(60) Provisional application No. 60/083,680, filed on Apr. 30, 1998, and provisional application No. 60/047,463, filed on May 22, 1997.

(51) Int. Cl.[7] .......................... C04B 38/00; C04B 38/06
(52) U.S. Cl. ........................ 501/80; 501/81; 423/326; 423/335
(58) Field of Search ................. 423/702, 705, 423/716, 326, 335; 501/80, 81

(56) References Cited

U.S. PATENT DOCUMENTS

| | | | |
|---|---|---|---|
| 4,888,309 A | 12/1989 | Araya | 501/80 |
| 5,250,282 A | 10/1993 | Kresge et al. | 423/705 |
| 5,334,368 A * | 8/1994 | Beck et al. | 423/328.2 |
| 5,573,983 A | 11/1996 | Nakamura et al. | 501/12 |
| 5,645,891 A | 7/1997 | Liu et al. | 427/376.2 |
| 5,849,215 A | 12/1998 | Gin et al. | |
| 5,858,457 A * | 1/1999 | Brinker et al. | 427/162 |
| 5,922,299 A * | 7/1999 | Bruinsma et al. | 423/335 |
| 5,958,367 A * | 9/1999 | Ying et al. | 423/701 |
| 6,054,111 A * | 4/2000 | Antonietti et al. | 419/2 |
| 6,420,063 B1 * | 7/2002 | Ozin et al. | 429/40 |

FOREIGN PATENT DOCUMENTS

EP 676 383 A * 10/1995

OTHER PUBLICATIONS

Schacht et al., "Oil–Water Interface Templating of Mesoporous Macroscale Structures," Science, vol. 273, pp. 768–771, Aug. 1996.*

Attard et al., "Liquid–Crystalline Phases as Templates for the Synthesis of Mesoporous Silica," Nature, vol. 378, pp 366–368, Nov. 1995.*

McGrath, "Formation of Two Lamellar Phases in the Dilute Region of a Quastiernary Surfactanct System," Langmuir 1997, 1987–1995.

McGrath, et al., "Formation of a Silicate L3 Phase With Continuously Adjustable Pore Sizes," Science, vol. 277, pp. 552–556, Jul. 25, 1997.

* cited by examiner

Primary Examiner—David Sample
(74) Attorney, Agent, or Firm—Wolff & Samson PC

(57) ABSTRACT

A mesoporous ceramic material is provided having a pore size diameter in the range of about 10–100 nanometers produced by templating with a ceramic precursor a lyotropic liquid crystalline $L_3$ phase consisting of a three-dimensional, random, nonperiodic network packing of a multiple connected continuous membrane. A preferred process for producing the inesoporous ceramic material includes producing a template of a lyotropic liquid crystalline $L_3$ phase by mixing a surfactant, a co-surfactant and hydrochloric acid, coating the template with an inorganic ceramic precursor by adding to the $L_3$ phase tetramethoxysilane (TMOS) or tetraethoxysilane (TEOS) and then converting the coated template to a ceramic by removing any remaining liquids

5 Claims, 14 Drawing Sheets .

FIG. 1
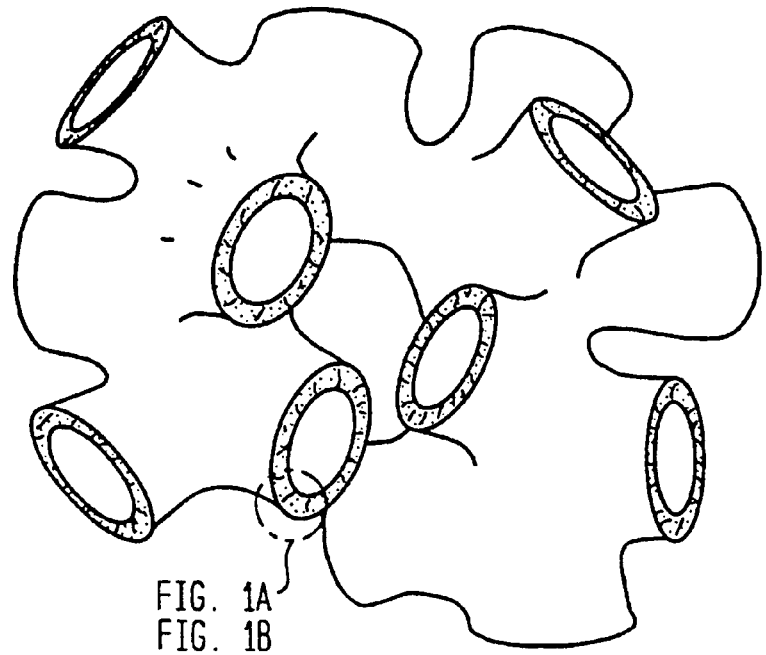
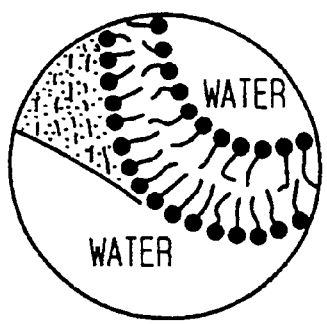
FIG. 1A
LIQUID CRYSTAL
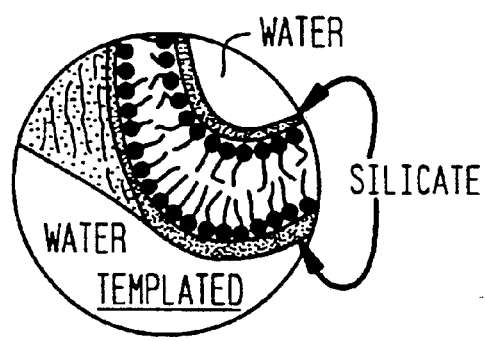
FIG. 1B
MINERALIZED

FIG. 4C
MESOSTRUCTURED SILICATE
A
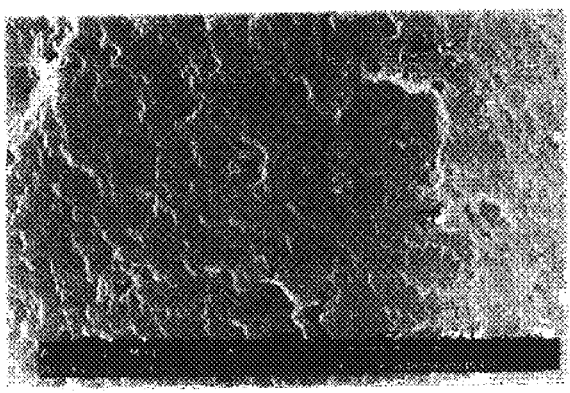
B
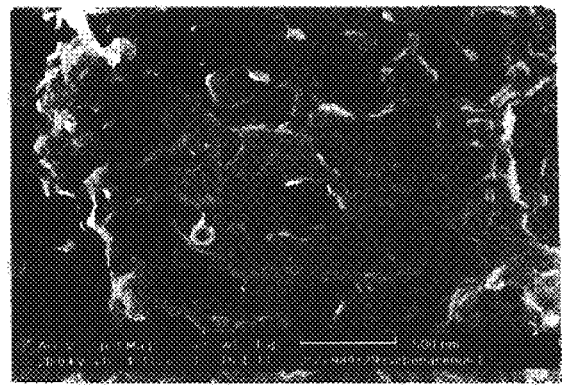
HEAT TREATED (600°C, 1h) $L_3$ SILICATE, AFTER SOLVENT EXCHANGE

FIG. 6

$L_3$ SYSTEM
- CATIONIC SURFACTANT: CETYLPYRIDINIUM CHLORIDE (CpCl)
- COSURFACTANT: HEXANOL ($C_6H_{13}OH$)
- HCl (AQ)
- SOLVENT CONTENT RANGES FROM 55 TO 95% BY WEIGHT. HEXANOL/CpCl RATIO FIXED AT 1.15
  - YIELDS PORES OF 5 TO 100 nm, SCALED TO SOLVENT CONTENT

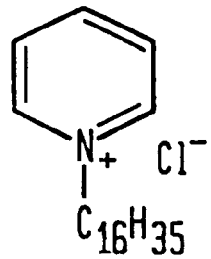

FIG. 7

$L_3$ VERSUS AEROGELS

- DENSITY: ~0.25 g/cm³
- SURFACE AREA: 400-1100 m²/g
- PORE SIZE: 5nm TO 100nm, NARROW DISTRIBUTION, CONTROLLED DIAMETER

- DENSITY: 0.7-0.001 g/cm³
- SURFACE AREA: 400-1000 m²/g
- PORE SIZE DISTRIBUTION: <2nm "MICROPORES", 2-50nm "MESOPORES", >50nm "MACROPORES"

FIG. 8
SOL-GEL PROCESSING
- ACID/BASE CATALYSIS:
  - ACID: LINEAR OLIGOSILOXANES [ -Si(R)$_2$OSi(R$_2$)- ]$_n$
  - BASE: CROSS LINKED SILOXANES
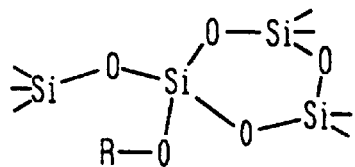

LYOTROPIC LIQUID CRYSTALLINE $L_3$ PHASE SILICATED NANOPOROUS MONOLITHIC COMPOSITES AND THEIR PRODUCTION

RELATED APPLICATIONS

This application is related to provisional applications U.S. Ser. No. 60/047,463, filed May 22, 1997, and provisional applications U.S. Ser. No. 60/083,680, filed Apr. 30, 1998.

GOVERNMENT LICENSE RIGHTS

The U.S. Government has a paid-up license in this invention and the right in limited circumstances to require the patent owner to license others on reasonable terms as provided by the terms of Grant DAAH04-95-1-0102) awarded by the U.S. Army Research Office, Grant DE-FG02-87ER60522 awarded by the Department of Energy and MRSEC Program of the National Science Foundation (DMR-940032).

BACKGROUND OF THE INVENTION

1. Field of the Invention

This invention relates to silicated inorganic/organic nanoporous monolithic composites conforming to the lyotropic liquid crystalline $L_3$ phase and the production of such composites. More specifically, this invention relates to nanoporous monolithic composites that are optically isotropic and transparent with a nonperiodic network.

2. Background of the Invention

There has been considerable focus recently on the elusive formation of mesoporous materials. This is due in part to the large gap that exists between what is able to be fabricated and what is observed in the natural world and also because of the potential uses for mesoporous materials in a wide range of applications and fields. Uses envisioned include filtration, biological separation with fine molecular weight cut off (such as for DNA separation), thin film pattern formation for use in electronics, ultracapacitors, sensors, and catalysts and catalyst supports.

A simple seashell, such as found in abalone, is based on calcium carbonate and has recently been shown to have an intricate three-dimensional mesoporous structure, which is inconsistent with the standard growth of native calcium carbonate (either rhombohedral or orthorhombic). Zaremba et al. have shown that the organic constituents control the growth of the inorganic component. By removing or adding crucial proteins the morphology of the calcium carbonate may be varied, showing the intimate connection between these components.

The shell of the abalone is an example of a biomineral; such materials are formed by a wide variety of organisms such as Echinodermata, diatoms, radiolarian, coccoliths, within the human body as well as by many plants. The extent of regulation of the inorganic material via the biological entities within the organism breaks biominerals into two classes, either biologically-induced or biologically-controlled growth, though in some cases this may be a subtle distinction. Nevertheless the requirements of both organic and inorganic components to produce such astounding materials is beyond doubt.

Biological inorganic/organic composites are most often highly porous three-dimensional structures, which may or may not be periodic. The channel system, which permeates throughout the sample, ranges in size from 1–100 nm (similar to the length scale of liquid crystalline phases formed via amphiphilic self-assembly) and is dependent upon the unique combination of the inorganic precursors and the living bio-organisms. Removal of the organic components subsequent to precipitation of the inorganic leaves the labyrinth unchanged. It would appear that this is accomplished naturally through the growth of hierarchically structured organic/inorganic composites. Soft materials (e.g., proteins, membranes and fibres) organized on appropriate length scales are used as frameworks for the growth of specifically oriented and shaped inorganic crystals with small unit cells (about 1 nm; e.g., ceramics such as $CaCO_3$, $SiO_2$, $Fe_3O_4$, and hydroxyapatite). The high modulus inorganic phase provides stiffness while the organic phase enhances toughness.

In addition to inorganic/organic mesoporous composites being important in the biological realm, such composites are gaining increasing significance in technological fields. Traditionally microporous materials such as zeolites (which are both naturally generated and synthetically available), in which a crystalline framework of aluminosilicates incorporate pores and cavities with dimensions ranging form ~1–1.2 nm have been successfully used as catalysts, reaction environments, molecular sieves and sorption materials (due to their large internal surface areas). The global topologies of these zeolitic materials, while not directly comparable to all classes of biominerals, do contain many of the key elements: (i) three-dimensional porosity, which permeates the entire structure; (ii) monosized pores and cavities; and (iii) a strong inorganic framework providing structural integrity. However, bridging the length-scale gap between what may be synthetically produced (microporous range) and what is naturally produced in such diverse and wide splendour (mesoporous range) has been a considerable stumbling block, given the huge potential of these materials in fields ranging from electronics and quantum dot fabrication to biological implants.

A major breakthrough in this endeavor occurred in the early 1990s. For more than a century, amphiphiles have been studied for their ability to self-assembly into a plethora of different geometrical labyrinths (commonly termed liquid crystals), the length scales of which match those commonly observed in biominerals (1–100 nm). In addition some of these liquid crystalline phase structures had been compared with those of zeolites, albeit on a much larger length scale. These materials potentially have the ability therefore to act as the bridge between the micro and mesoporous inorganic materials regime. Beck et al. using a dilute solution of cationic amphiphiles (micellar solution) and inorganic precursors (aluminosilicates) successfully fabricated inorganic materials which conformed to the topological forms of the hexagonal, bicontinuous cubic and lamellar liquid crystalline phases of amphiphilic molecules, with pore dimensions of approximately 4 nm, obtained upon removal of the amphiphilic molecules. Due to the low concentrations of amphiphile in solution a co-assembly mechanism was proposed to explain the formation of the higher order topologies not normally associated with such low concentrations.

In the intervening years numerous such materials were developed. However, such materials have been severely limited by the maximum pore size able to be obtained, the necessity of removing the amphiphilic material to gain access to the pores once polymerization has occurred, the lack of predictive control over product topologies and the materials produced invariably precipitating from solution as opaque micron sized grains.

Such obstacles limit the potential of these materials. It is highly preferred that the composites be large area thin films or uniform monoliths rather than powders. By working in the concentration domains correlating to the native hexagonal, bicontinuous cubic and lamellar liquid crystalline phases in a nonionic/water system Attard et al., produced monolithic inorganic materials whose structure mirrored the original geometry of the amphiphile. The mechanism followed here being closer to temptation than coassembly, e.g., the methanol produced as a byproduct in the reaction was removed to ensure the solvent volume fraction remained constant throughout the reaction. This methodology was however restrictive in the pore dimensions able to be obtained. An additional problem exists that one must guarantee that all the byproduct (and only the byproduct) is removed during synthesis to ensure the integrity of the phase is kept.

OBJECTS AND SUMMARY OF THE INVENTION

It is an object of this invention to reproducibly produce a ceramized or silicated inorganic/organic nanoporous monolithic composite conforming to the lyotropic liquid crystalline $L_3$ phase.

It is a further object of this invention to reproducibly produce a nanoporous monolithic composite conforming to the lyotropic liquid crystalline $L_3$ phase that is optically isotropic and transparent with a nonperiodic network.

It is still a further object of this invention to produce an optically isotropic and transparent monolithic nanoporous inorganic of low density and refractive index with defined three-dimensional topology and fixed pore dimensions, which could be varied easily.

It is yet another object of this invention to provide a mesopore that has a continuous network of pores, that is formed from a concentrated surfactant phase, and when the inorganic precursor is added, it does not perturb the preformed structure, and the solvent, swelling agent and surfactant contained therein can be easily removed from the monolith.

It is yet another object of this invention to produce nanoporous monolithic composite materials conforming to the lyotropic liquid crystalline $L_3$ phase that are useful in the areas of magnetism, optics, electronics and biomaterials.

It is another object of this invention to produce a nanoporous inorganic material that may be useful: in controlled filtration, in the growth of nanocomposites, as a trap for large materials (e.g., proteins), as a catalyst, as a catalyst support, as insulation, as a selective liquid barrier, as an osmotic membrane, for energy storage, as an ultracapacitor, as optoelectronic devices, for heavy metal isolation, removal, silver filtration, and/or for silver ion reduction.

Generally, the objects of this invention are achieved the production of mesoporous ceramic materials by templating the $L_3$ phase. Broadly, a mesopore is defined as a pore size diameter in the range of 10–100 nanometers in diameter. Aerogels have nanopores, micropores and macropores. The pore surface area is comparable to that found in an aerogel, but the pore size distribution is narrower, i.e. more uniform in diameter. Broadly, the process for producing the structure comprises creating a liquid crystal, the $L_3$ phase, coating the liquid crystal with an inorganic precursor and then converting the coated liquid crystal to a ceramic. That is what is referred to as template.

Another process for forming this mesopore materials is by coassembly. This process, for example, comprises forming an hexagonal array of surfactant microtubules, coating the microtubules with an inorganic base. The reason it is called coassembly is that instead taking a "template", i.e., a structure that already exists, and coating the outside with a ceramic or inorganic precursor, in coassembly you mix the inorganic precursor with the surfactant and the mesostructure then spontaneously forms.

More specifically, the objects of this invention are achieved by the ceramized or silicated inorganic/organic nanoporous monolithic composites conforming to the lyotropic liquid crystalline $L_3$ phase and the process of producing such composites. The L pease is formed by the self-assembling of amphiphiles. The $L_3$ phase produced has many properties, which make it particularly advantageous for use as a template in the formation of mesoporous inorganic materials. The $L_3$ phase consists of a three-dimensional, random, nonperiodic network packing of a multiple connected continuous membrane, which evenly sub-divides the solvent into two continuous volumes. Transmission electron micrographs are consistent with this proposed random morphology. The average pore and cavity dimensions of the water domains are controlled by the solvent volume fraction, varying from 1–100 nm and permeate the entire sample. Measured characteristic dimensions are from 6 to >35 nanometers. Measured surface areas are comparable to aerogels, up to 1000 $m^2 \cdot g^{-1}$. Accessible pores (which permeate the entire structure) in the silicated material correlate with the solvent domain of the original liquid crystalline phase, therefore negating the removal of surfactant in order to gain entry through these pores. This fine control leads to a very low polydispersity in these dimensions for a given solvent volume fraction. X-ray scattering studies confirm a low polydispersity in pore openings for a given solvent fraction. In addition the $L_3$ phase is advantageously optically isotropic and water clear. The $L_3$ phase has a viscosity comparable to that of water, which makes it easy to add inorganic precursors, which is often a problem in the more viscous, hexagonal, bicontinuous cubic and lamellar phases.

The compositions of this invention are true mesostructured silicates fomed by templating $L_3$ liquid crystals. The pore surface areas are comparable to aerogels but with a narrow pore size distribution and a uniform, continuous pore network. The mesostructure is retained following chemical or thermal extractions.

DESCRIPTION OF THE FIGURES

FIG. 1 is a schematic representation of an $L_3$ phase.

FIG. 1A is an exploded view of a surfactant $L_3$ phase.

FIG. 1B is an exploded view of a silicate $L_3$ phase.

FIG. 4C is a scanning electron microscope image of a fracture surface of the silicate gel of this invention. Image A is of a lower magnification than image B. The structure is monolithic and pores percolate throughout the structure.

FIG. 6 lists the components of one embodiment of the $L_3$ System.

FIG. 7 compares the $L_3$ System structure to that of aerogels. The density of the $L_3$ System structure is within the range of an aerogel and the measured surface areas are comparable to each other. A primary benefit of the structures of this invention is the narrow pore size distribution. An aerogel has a wide pore size distribution, i.e., the aerogel has micropores, mesopores and macropores ranging in size from less than 2 nanometers to 50 nanometers and over. In the structures of this invention the pore size distribution can be tuned to a very narrow distribution within the range of 5 nanometers up to a 100 nanometers, e.g., within a 20% distribution range such as 40–60 nanometers.

FIG. 8 is a schematic representation of representation of the acid or base catalysis reation that forms the structures of this invention.

DETAILED DESCRIPTION OF THE INVENTION

Figure 5:
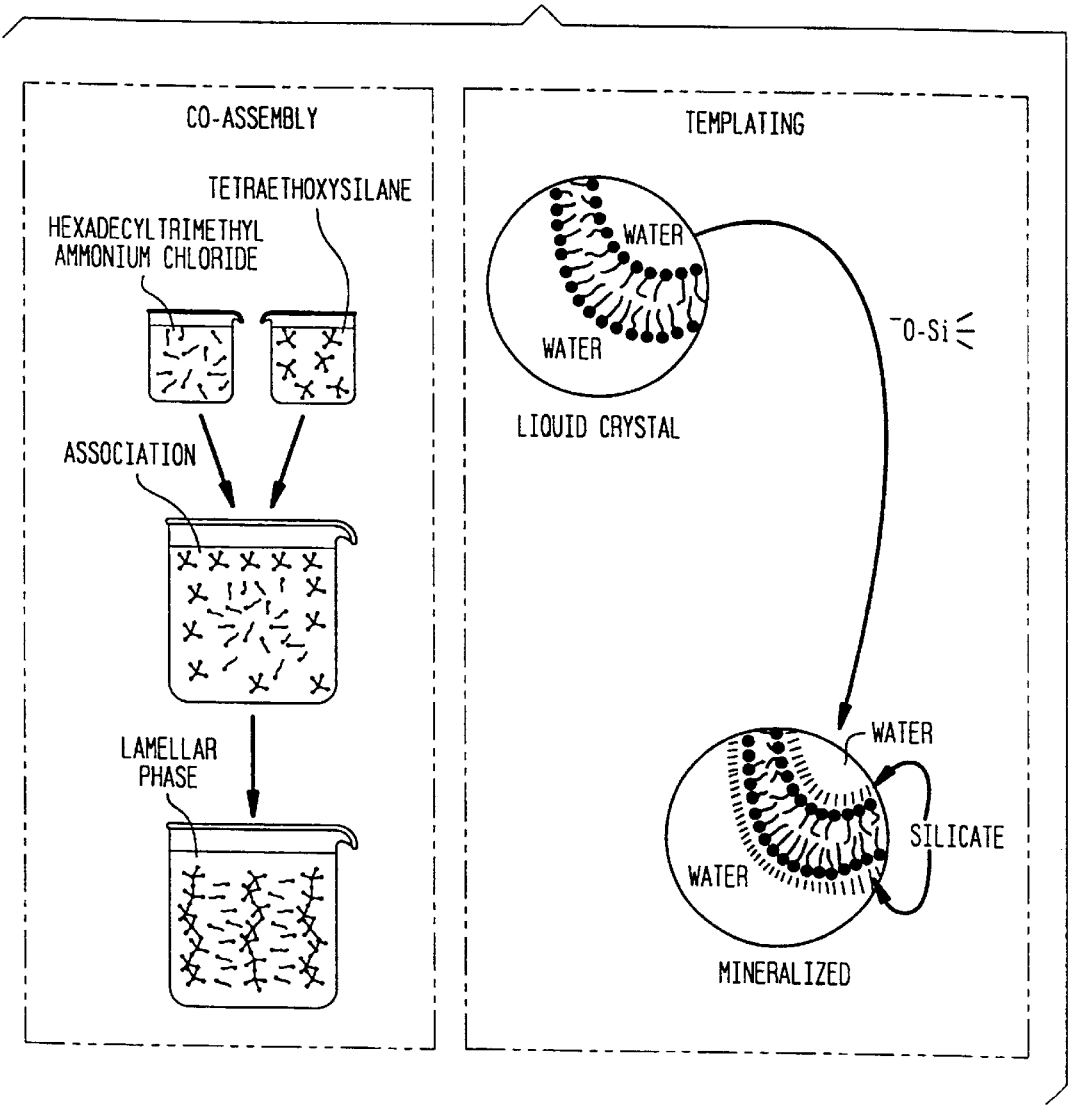
FIG. 5 is a schematic of the two routes to producing mesostructures of this invention, i.e., Co-Assembly and Templating. Templating comprises creating a liquid crystal, the $L_3$ phase, coating the liquid crystal with an inorganic precursor and then converting the coated liquid crystal to a ceramic. Co-assembly comprises mixing the inorganic precursor with the surfactant and the mesostructure then spontaneosly forms. The reason it is called co-assembly is that instead taking a "template", i.e., a structure that already exists, and coating the outside with a ceramic or inorganic precursor, in co-assembly the inorganic precursor (e.g., tetraethoxysilane) is mixed with the surfactant (e.g., hexadecyltrimethyl ammonium chloride).
Figure 9:
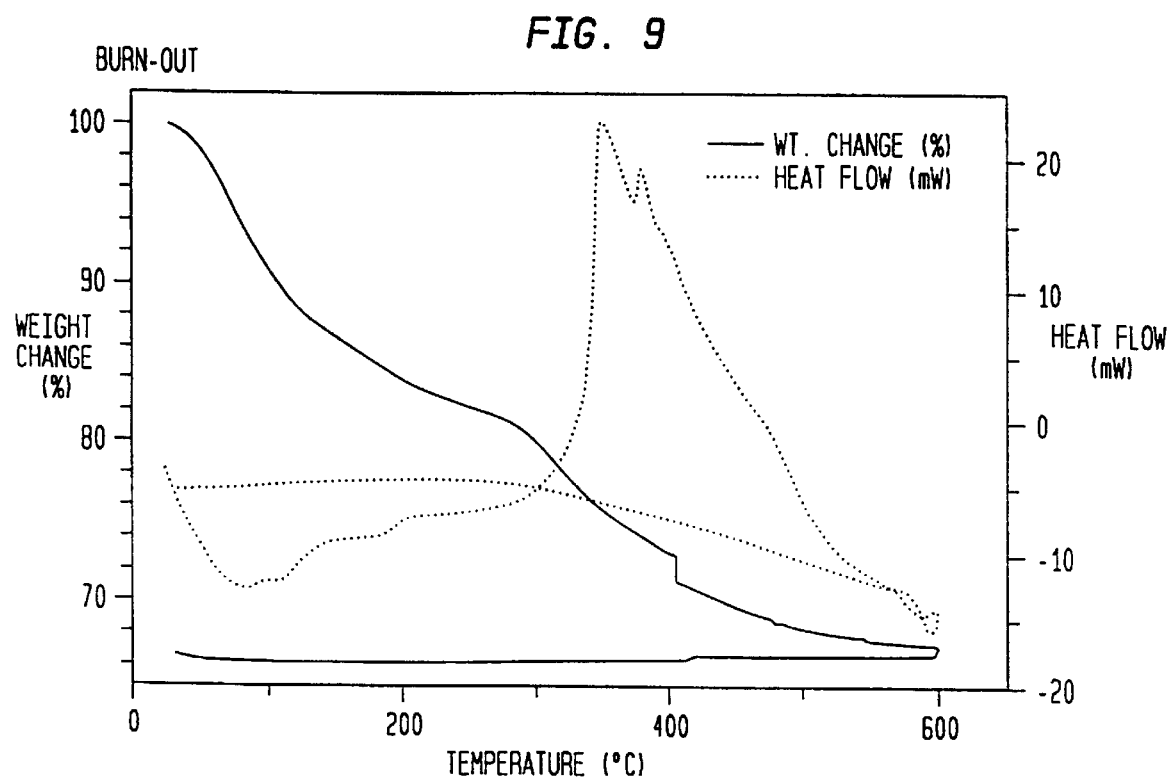
FIG. 9 is an example of the "burn-out" of the composition of this invention. At 600 degrees Celsius the composition does not melt or fuse. At 600 degrees Celsius the organics (the surfactants) are burnt out, i.e., removed through thermolysis. The surfactants thermally decompose at about 300 degrees Celsius. However, because the organics are entrapped in a silica matrix they do not burn out completely. The burnout profile is not as sharp as a standard burn-out. In the composition of this invention, just after drying, the surface areas fall in the range of 400–500 meters squared per gram. After "burn-out" in air at 600 degrees Celsius the surface area is increased to over 900 meters squared per gram.
Figure 10:
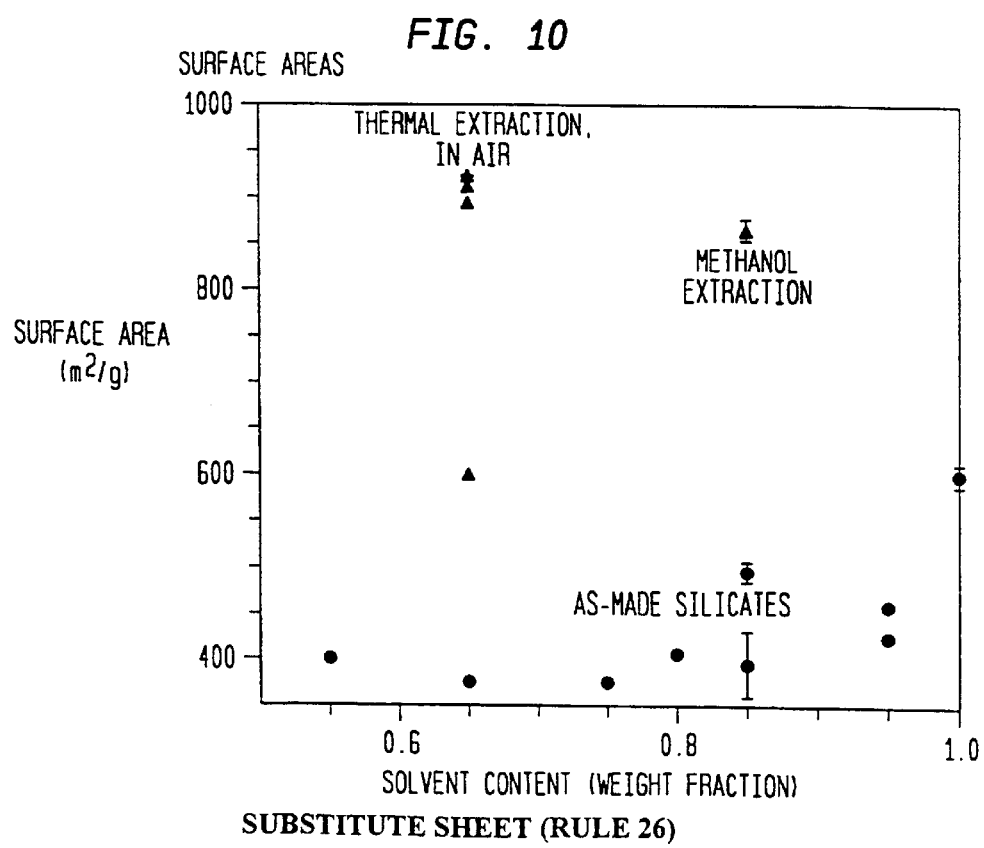
FIGS. 10 and 11 are graphs depicting the performance of several type solvent extractions and the effect on surface areas of the $L_3$ structures. Methanol extraction is preferred, involves no heat, is effective in dissolving out the organics and can be easily removed from the structure.
Figure 11:
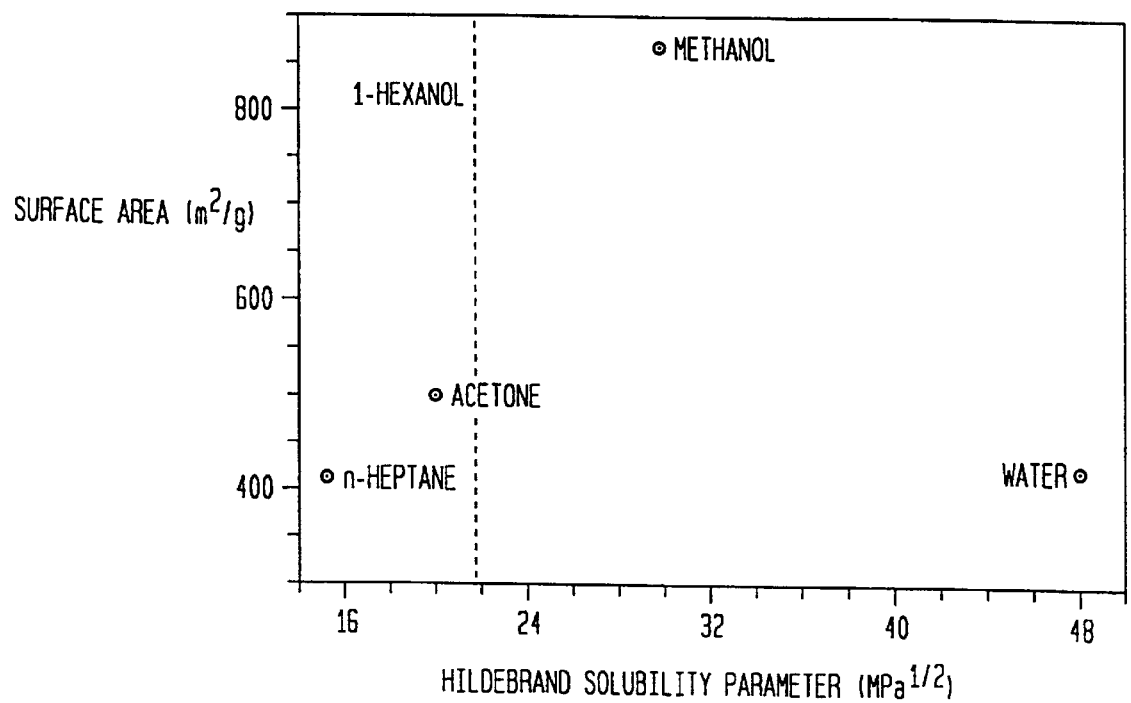
Figure 12:
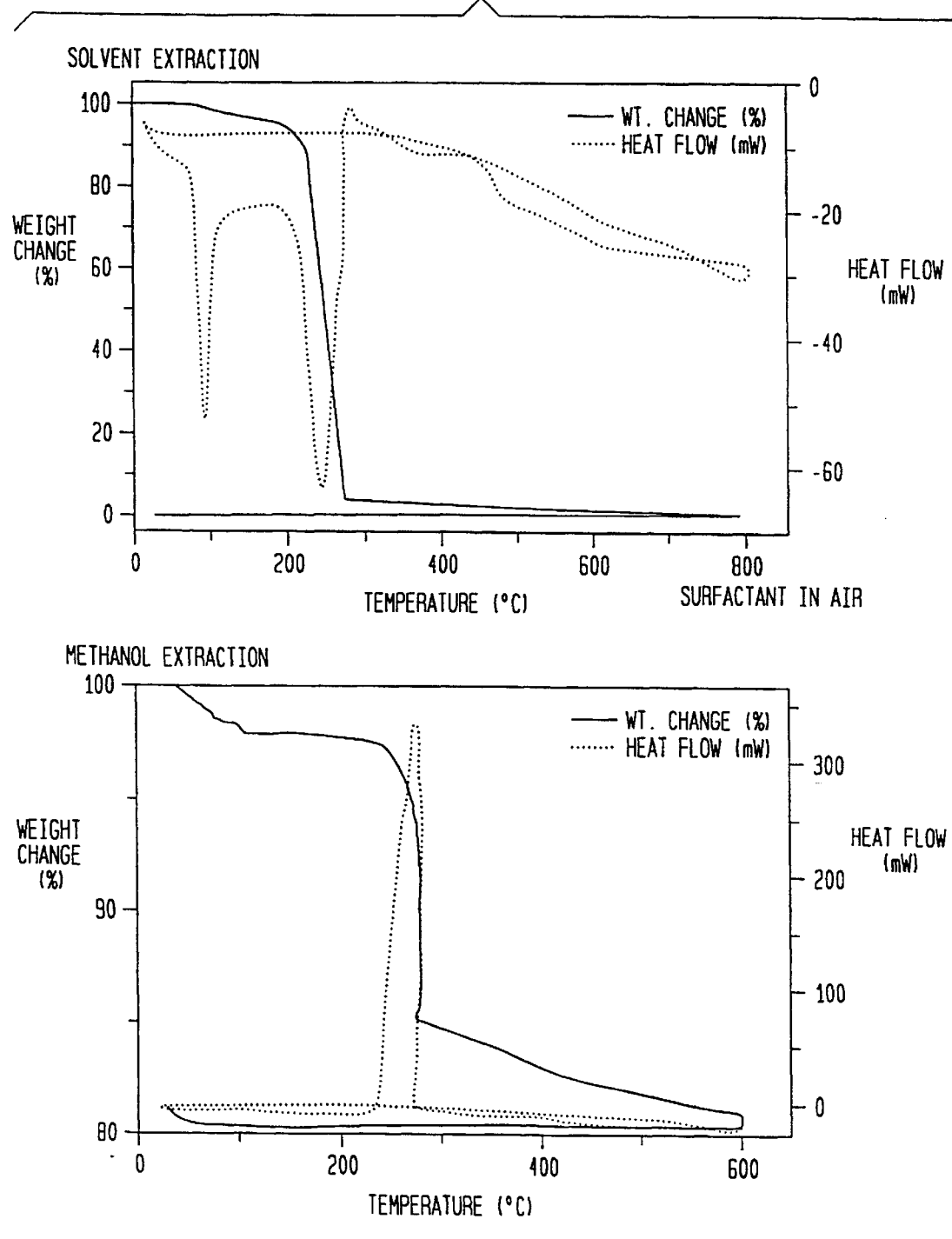
FIG. 12 compares the thermal burn out of the surfactant in air to the thermal burn out of the methanol extracted material. The burn outs are very similar which is a good indication that the porosity is very open and the surfactant is being removed from between the silicate layers and the pore structure is being opened or increased and the pore distribution is changing.
Figure 13:
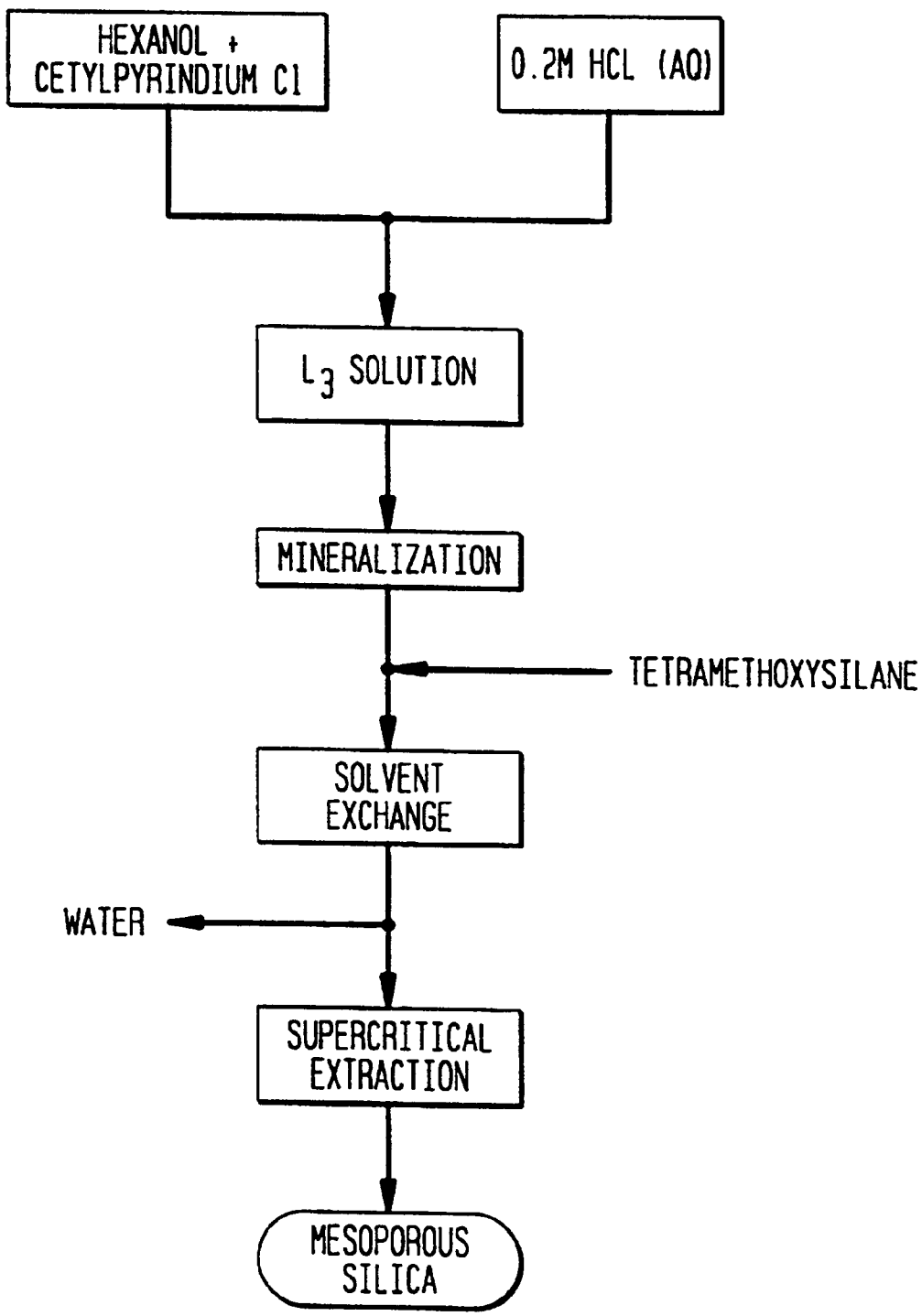
FIG. 13 is a schematic representation of the preferred process of this invention.

Generally there are two processes for making the inorganic/organic nanoporous monolithic composites conforming to the lyotropic liquid crystalline $L_3$ phase of this invention. Referring to FIG. 5, these processes are by Co-Assembly and Templating. The preferred method of templating comprises creating a liquid crystal, the $L_3$ phase, coating the liquid crystal with an inorganic precursor and then converting the coated liquid crystal to a ceramic. Co-assembly comprises forming an hexagonal array of surfactant microtubules and coating the microtubules with an inorganic base. The reason it is called co-assembly is that instead taking a "template", i.e., a structure that already exists, and coating the outside with a ceramic or inorganic precursor, in co-assembly you mix the inorganic precursor (e.g., tetraethoxysilane) with the surfactant (e.g., hexadecyltrimethyl ammonium chloride).

In the process of co-assembly the surfactant associates itself through a chemical interaction with the inorganic precursor. Then those moieties, the combined structure or associated molecules, form spontaneously into an ordered structure. FIG. 5 shows a lamellar phase, i.e., a layered structure, with the surfactant forming bilayers. It is believed that the surfactant head groups on either side and tails are brought into proximity with the inorganic precursor they react with each other and condense into a ceramic structure. The structure is an hexagonal phase of formed tubules. These tubules then stack in hexagonal arrays and, theoretically, there is no limit how long those hexagonal tubules, hexagonally packed tubules, can be.

In the preferred process of templating, an existing liquid crystal structure is coated with the ceramic precursor and then reacts to solidify into a copy of the surfactant structure, but in a solid form.

EXAMPLES

Materials

Figure 2:
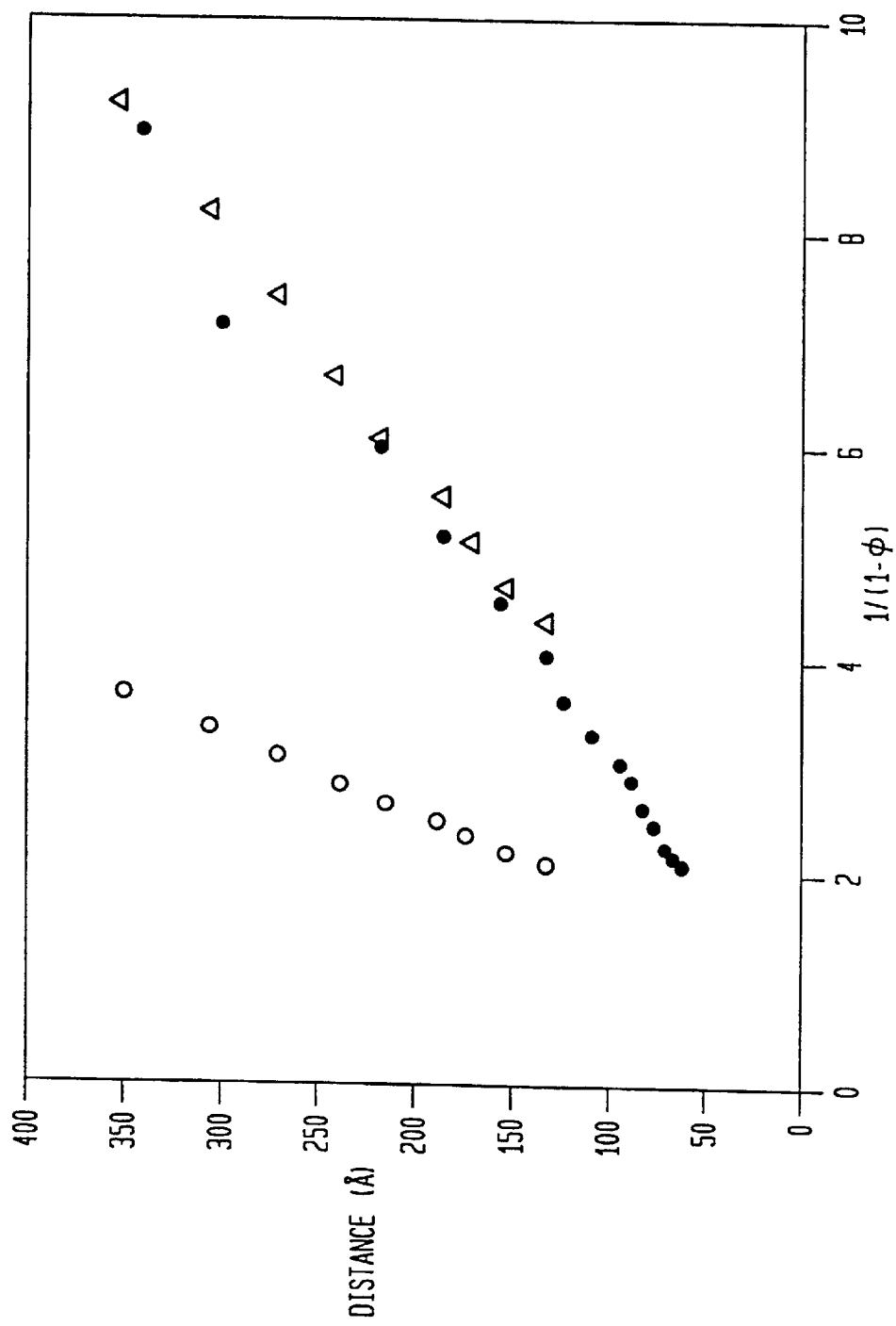
FIG. 2 is a graph depicting the dilution law (characteristic distance as a function of volume fraction) for the original $L_3$ phase, •, silicate $L_3$, O and scaled silicate $L_3$, Δ, (scaled with respect to increased total volume due to addition of the alkoxysilane and subsequent hydrolysis). The dimensions of the $L_3$ phases were determined using small-angle X-ray diffraction (SAXS) at 20° C. Data was obtained using a Rigaku RU-200 rotating anode X-ray diffractometer equipped with a microfocus cup. The generated Cu Kα X-rays were focused via bent mirror optics. Two-dimensional X-ray images were collected with a home built CCD detector based on a Thomson $512^2$-pixel CCD. The digital powder diffraction images were azimuthally integrated along an arc of ±89.9° from the meridional axis to generate plots of scattered intensity versus Q=4πsinθ/1.54 Å, where 2θ is the angle between the incident and scattered beam directions. Samples were flame sealed in X-ray capillaries of diameter 1.5 mm. The maximum characteristic spacing that could be measured was 35 nm; for larger spacings the desired peak could not be resolved from the specimen and camera scatter near the beam stop.

The $L_3$ phase used in this invention is a thermodynamically stable phase composed of the surfactant cetylpyridinium chloride (CpCl, 1-hexadecylpyridinium chloride monohydrate, $C_{16}H_{33}(N^+)C_5H_5(Cl^-) \cdot H_2O$), the co-surfactant hexanol ($C_6H_{13}OH$, ca. 98% by GC), and hydrochloric acid (0.2 M, aqueous). Varying amounts of the 0.2 M hydrochloric acid 'solvent' were used to prepare samples, ranging from 50% up to 95% by weight of the overall mixture. A fixed ratio of 1.15 (by weight) hexanol to CpCl was used in all samples except in the higher solvent contents (>90% by weight); in the latter solutions the hexanol:CpCl ratio was increased to 1.20. Throughout most of the solvent content range of interest, the $L_3$ phase remains stable with respect to the solvent content; the phase field narrows and curves upwards when the solvent content exceeds 90% by weight (FIG. 2). K. M. McGrath, "Lamellar Phases in Surfactant Systems," Langmuir 13 [7] 1987–95 (1997). The source of silica for silicification of the $L_3$ phase was typically tetramethoxysilane (TMOS) although tetraethoxysilane (TEOS) was used in some cases.

The cetylpyridinium chloride and hexanol were purchased from Sigma Chemical Co. The sodium chloride (99.999% pure) was obtained from Aldrich Chemical Co. Ltd. The concentrated hydrochloric acid was a standard chemical store grade and was diluted to the appropriate concentration. The water used was distilled and deionized with a conductivity between 1–10 MÙ·cm. This water source was used for all dilutions and preparations of solutions. The tetramethoxysilane (TMOS, $(CH_3O)_4Si$, $\geq 97\%$ pure) and tetraethoxysilane (TEOS, $(CH_3CH_2O)_4Si$, $\geq 97\%$ pure) were obtained from Alfa Aesar and Fluka Chemica-BioChemika All chemicals were used as received.

Procedure

The order of mixing the three components of the $L_3$ system was not important to the final result, but it was necessary to maintain the correct hexanol/CpCl ratio to ensure phase purity and stability as stated above. Typically, the CpCl and hexanol co-surfactants were put into an appropriate container, to which the required amount of 0.2 M hydrochloric acid was added. The samples were stirred using a magnetic stirrer and held at room temperature, by using a water bath if necessary, during stirring. If the stirring is too vigorous it will cause the solution to foam. Turning down the stirring rate and/or allowing the sample to sit for a few minutes was usually sufficient to eliminate bubbles. After 20–30 minutes of stirring, the samples (except the high solvent samples) became clear and would remain clear if set aside. High solvent samples were very slightly milky white, possibly due to the formation of large-pore diameter structures, which scatter visible light. After setting without stirring for several minutes, the samples (except the high solvent) were water clear, indicating that the $L_3$ phase was quickly established once agitation was removed. High solvent samples remained slightly milky in appearance. Samples that exhibited phase separation (e.g., two immiscible liquid layers or pronounced milkiness due to micelle formation) could be 'recovered' by adding small amounts of the required component, either hexanol or CpCl, followed by renewed stirring until clear. In this study samples exhibiting separation were discarded before silicification.

The $L_3$ liquids were quite stable with time and could be left to sit for several weeks if well sealed against the loss of solvent or hexanol. Indeed samples that are flame sealed have no definable lifetime and should be stable indefinitely. After sitting several hours, often overnight, the $L_3$ phase would be 'silicated' by the addition of tetramethoxysilane (TMOS) or tetraethoxysilane (TEOS) to the sample. To ensure complete hydrolysis of the alkoxide, the ratio of water-to-alkoxide was kept slightly lower than 4:1 (molar). TMOS was typically added without stirring the $L_3$ phase solution. Significant heat was immediately generated by the hydrolysis of the TMOS in the acid solution; too rapid addition of the TMOS would result in boiling the sample and loss of hexanol. This factor alone might explain some of the discrepancies observed to exist between similar samples—the hexanol/CpCl ratio is vital both in the synthesis of the $L_3$ phase and to maintain the phase during silicification. After hydrolysis was complete (taken as the point at which the temperature of the sample returned to ambient), the samples were well sealed using Parafilm® and set aside to gel. The rate of hydrolysis is reduced when TEOS is used instead of TMOS and for some samples stirring was required to ensure that hydrolysis was complete prior to the initiation of condensation. In this case the point of clearing was taken as an indication that hydrolysis had proceeded sufficiently for solubility of the silicate precursor. Both TMOS and TEOS samples were treated similarly and results were comparable. However, only silicates generated using the TMOS precursor will be further discussed herein.

The samples would gel within 2–5 hours after adding TMOS if placed in an oven at 60° C. This step was found to be unnecessary if the $L_3$ precursor solution had been properly prepared prior to silicification. Gelation would occur in samples held at room temperature in about two days. In either case, the gelled samples were colorless and clear (including the high solvent samples), optically isotropic, and shaped by the container. The gels could be strengthened by being kept at 60° C. for a week or merely by setting aside for longer times. Volume reduction could be slowed by keeping the samples under solvent; a number of organic solvents were used to remove water from the gel via solvent exchange, helping to slowly dry, retard shrinkage, and thereby prevent fragmenting during drying. As will be discussed, shrinkage remains a problem. Realistic and reproducible quantitative results obtained from x-ray could only be achieved when dealing with samples that had been treated in an identical manner. Knowledge of the amount of shrinkage was required in order to determine the correct characteristic dimension for the gel, thereby considerable efforts were made to ensure that all samples which underwent analysis by the various methodologies were treated in the same way.

Solvent Exchange, Extraction, and Drying

Solvent exchange was typically done by replacing the retained liquid in the gel (principally methanol and water) with an organic solvent over a period of several days. In one such process, a sample would be covered with acetone shortly after the sample was gelled (that is, when the sample would no longer flow if the container was tilted or inverted). After several hours, the acetone would be poured off and replaced with fresh solvent. This process was repeated over several days. During the solvent exchange, the volume of the sample gel would not appear to change appreciably although internal fractures were frequently observed and the sample usually pulled away slightly from the container walls. This process was not sufficient to prevent sample shrinkage once the sample removed from the solvent bath and allowed to completely dry; when exposed to air, the samples began to fracture and shrink.

As with other methods of sol-gel preparations, shrinkage remains a serious drawback in the formation and reproducibility of $L_3$ silicates. Samples could be air-dried over a period of 48 hours and remain clear and monolithic with few cracks. However, final volumes were <50% of the initial in samples that were permitted to dry quickly in air, indicating a significant loss of pore volume. Samples kept under liquid shrank more slowly and retained more of the original volume (losing only ~10–15% of the initial volume), but remained fragile and very sensitive to subsequent handling and drying in air. When heated at temperatures above 100° C., the samples invariably broke up into fragments. Longer curing times resulted in stronger samples, but shrinkage remained significant.

Continuous, Soxhlet extraction was used to remove organic components. The surfactant cetylpyridium chloride is soluble in water, ethanol, and methanol. Hexanol is only slightly miscible with water (8 parts per 100) but soluble in ethanol. J. A. Dean, "Lange's Handbook of Chemistry," 13$^{th}$ edition, p. 7–437 (McGraw-Hill Book Co., New York, 1985). Several solvents, chosen to cover a range of Hildebrand solubility parameters, were used as extracting solvents. A sample of $L_3$ silicate would be placed in the extraction chamber of the Soxhlet extraction apparatus, cushioned on both sides by glass wool. A 500 mL boiling flask was half filled with solvent and heated to boiling. The distillation of the solvent resulted in a continuous stream of hot solvent flowing through the sample. Typical extraction runs lasted for four days. The extracted samples were allowed to air dry, then removed to a vacuum drying oven and held at 50° C. under vacuum. During drying the samples invariably fractured into small pieces.

Supercritical extraction (SCE) was used to prepare some samples for TEM analysis. Typical runs were made in supercritical $CO_2$, at temperatures and pressures well above the critical point. SCE was done using a Milton Roy SCE Laboratory Methods Development System, with runs averaging 8–10 hours in duration. Samples to be extracted were placed in the extraction chamber after undergoing solvent exchange in acetone, followed by air drying. The extraction chamber was sealed and slowly pressurized to >1×10$^8$ Pa, then heated to 40 20 C. At the selected temperature and pressure, a shunt valve to a separation vessel was opened, taking care to maintain supercritical conditions in the extraction chamber. Once pressures and temperatures in the extraction and separation vessels were equalized, a secondary shunt valve from the separation vessel to atmosphere was cracked to permit a continuous venting of $CO_2$ from the system and providing a continuous stream of extracting fluid to pass through the sample. Extracted material was retained in the separation vessel.

Simple heat treatments of samples were done in air furnaces or under oxygen-enriched atmospheres. A typical heating schedule consisted of (i) a slow ramp (5–10° C./min) to 100° C., (ii) dwell at 100° C. for two hours, (iii) ramp to higher temperature (5–10° C./min),(iv) dwell of varying duration at higher temperature, and (v) furnace cool back to ambient. Samples were heat treated at 300° C. up to 30 hours, at 500° C. for 2–4 hours, at 600° C. for no more than 2 h. Samples were invariably fractured by the furnace treatment into large granules, pieces ranging in size from 1 to 3 mm along the characteristic length. Final sample color depended upon extraction method used. For example, acetone-exchanged samples varied from black (following 300° C. heat treatment), through yellow (500° C.), to clear (600° C.). In other examples, n-heptane-extracted samples were red after heat treating at 400° C. for 4 hours whereas methanol-extracted samples were clear after heat treating at 300° C. for 2 hours.

Generally, simple solvent extraction may be used on small particulate in order to remove the organic components. However, in order to produce larger structures, such as the size of aerogels, it is preferred, if not essential, to use supercritical extraction and supercritical drying to remove the organic component. One advantage to the use of supercritical extraction is that it proceeds more rapidly than simple solvent extraction. Another advantage is that the use of supercritical extraction do not set up differential drying stresses in the material which can occur with simple solvent extraction.

X-ray Diffraction

Powder diffraction data for all samples were obtained using a Rigaku RU-200 rotating anode x-ray diffractometer equipped with a microfocus cup. The generated Cu-Kα x-rays were focused with bent mirror optics. Repeat distances ranging from 1 to 35 nm could be determined using these mirrors for the $L_3$ systems studied here. Using this setup characteristic spacings up to 70 nm are able to be probed for samples which presented strong, sharp Bragg reflections since these are superimposed on the small-angle scattering and leakage around the beam stop and could be easily resolved. However, for the systems studied here the small-angle scattering was increased significantly due to the presence of amorphous silica. This creates the problem that unless the liquid crystalline phase is a strong x-ray diffractor, scattering close to the beam stop or that which falls within the small-angle scattering q range is not able to be isolated from this broad range scattering. The liquid crystalline $L_3$ phase unfortunately is not a strong x-ray diffractor. This phase suffers from the additional problems that it does not show a sharp Bragg diffraction peak (due to the random slicing of the channels inherent in the phase by the incident x-ray beam), nor diffraction peaks of order higher than first. This restricted the possibility of obtaining data to samples below ~90 wt % correlating to a repeat distance of ~35 nm. Two-dimensional x-ray images were collected with a home-built CCD detector based on a Thomson 512 by 512-pixel CCD [Tate, 1997 #1269]. Thus enabling observation of any orientational effects within the sample.

Digital powder diffraction images were azimuthally integrated along an arc of ±89.9° from the meridional axis to generate plots of scattered intensity versus $q=4\pi\sin\theta/1.54$ Å, where $2\theta$ is the angle between the incident and scattered beam directions to obtain one-dimensional diffraction patterns. Samples were either flame sealed in glass x-ray capillaries of approximately 1.5 mm in diameter or chunks of the silicated materials were held in a special holder. Problems of attenuation of the beam by the prepared silicated $L_3$ phase chunks further hampered obtaining clean diffraction patterns. The beam intensity of the incident beam was significantly reduced for the silicated $L_3$ phases in comparison to $L_3$ phases consisting of surfactant/cosurfactant molecules alone. This leads to an increase in the time required to obtain sufficiently low signal-to-noise. Further problems due to increased data collection times arose from pixel overflow of the two-dimensional detector, resulting in a maximum data collection time. Multiple data collections were utilized, these were then added together, however signal-to-noise was still problematic. Anomalous scattering was also detected off facets of the silicated $L_3$ samples as samples were randomly cracked (this remains a serious drawback of these samples). This led to highly intense spikes superimposed on the diffraction pattern for some samples. The maximum characteristic spacing was, due to the combination of these experimental limitations, restricted to 35 nm; for larger spacings the desired peak could not be resolved from the specimen and camera scatter near the beam stop.

Surface Area Measurements, Thermal Analysis, and
Electron Microscopy

Surface area measurements were made on dried samples (with and without extraction) using a Micromeritics Flowsorb II 2300 single-point BET. Samples were air dried, vacuum dried at 50° C. for at least 8 hours, then degassed at 100° C. under a flowing 70/30 He/$N_2$ gas mixture for several hours prior to measurement. Surface areas were determined from the amount of nitrogen gas adsorbed onto the silicate surfaces from a flowing stream of 70/30 He/$N_2$ gas at liquid nitrogen temperature (−196° C.).

Simultaneous differential scanning calorimetry (DSC) and thermogravimetric analysis (TGA) were performed using a Rheometrics STA1500. Typical furnace runs were done under streaming air. The standard furnace run consisted of the following steps: (i) ramp from ambient to 600° C. at 5°/min; (ii) hold at 600° C. for one hour; and (iii) ramp at 20° C./min back to ambient.

Results and Discussion

Preparation

The liquid crystalline $L_3$ phase is well known for its remarkable properties. It is found in a limited number of amphiphilic systems and is generally stable over only very narrow composition and temperature ranges. FIG. 2 shows a slice through the quaternary phase diagram for the CpCl/hexanol/brine (1 wt % NaCl in water) system, in which this phase forms. The $L_3$ phase is pure within the domains of 53 to >98 wt % solvent and for hexanol-to-CpCl ratios of 1.12 to 1.21. The NaCl component is able to be replaced by HCl either completely or partially (as long as the total chloride concentration remains constant) without significantly altering these phase boundaries. This substitution allowed the pH of the solutions to be regulated, thereby controlling the hydrolysis and condensation rates of the silicate polymerization. For all samples described here the chloride ion source was HCl.

The $L_3$ phase is bordered in the phase diagram by the lamellar phase (an indefinite stacking of bilayers intercalated with water) on one side (the lower hexanol side) and a multiphase region containing reverse micelles on the other. Both the composition of solvent and the ratio between the surfactant (CpCl) and the cosurfactant (in this case hexanol) maybe used to manipulate the phase. The $L_3$ phase Gaussian curvature is globally negative (i.e. the interface between aqueous and non-aqueous regions bends away from the hydrocarbon chains of the amphiphile). Locally, however, the curvature varies from being flat (Gaussian curvature=0, "lamellar-like" stacking) to a minimum in the Gaussian curvature. Without the addition of hexanol, CpCl is unable to vary the curvature of the membrane in order for the $L_3$ phase to be formed due to headgroup interactions. Hexanol with its short hydrocarbon chain and small hydrophilic hydroxyl group is capable of inducing such variations by its specific placement in the membrane. At regions of high negative curvature the repulsive interaction between the headgroups of the amphiphiles destabilize the system, hexanol preferentially sites itself such that it relaxes this interaction by acting as a spacer, thereby decreases the rigidity of the membrane. Thus the addition of hexanol in the correct ratio induces formation of the $L_3$ phase. This occurs over a very small range of hexanol to CpCl concentrations and eventually when there is an excess of hexanol to the requirements of the $L_3$ phase a phase transition occurs. The new phase has a close to uniform negative Gaussian curvature over the entire membrane. If too little is added the average Gaussian curvature is closer to zero and the lamellar phase results. Hence the three states are easily manipulated by varying the ratio of hexanol-to-CpCl.

These three states are easily distinguished by eye, thereby assisting in determining if a single equilibrated $L_3$ phase has been obtained. The lamellar phase has, compared to both the $L_3$ and the reverse micelle phase, a very high viscosity. This phase is less dense than the $L_3$ phase and is in addition birefringent. The $L_3$ phase in contrast has a viscosity comparable with that of water, is completely optically homogeneous, crystal clear and optically isotropic (indeed it is visually almost indistinct from water). The second isotropic phase is also readily distinguishable from the $L_3$ phase in that despite being of low viscosity and optically isotropic it is not when in coexistence with the $L_3$ phase optically clear. It is in comparison with the $L_3$ phase turbid, thus making it also easily recognized. Therefore samples which initially not in the pure $L_3$ phase region are distinct from those in a single equilibrated phase and may be pushed into this region by adding CpCl (in the case of the $L_3$ phase plus the second isotropic phase) or hexanol (in the case of the $L_3$ phase plus the lamellar phase). Equilibrated $L_3$ samples may be formed within a day, times may be considerably less for more dilute systems.

Following the method outlined above, silicated $L_3$ phases could be easily and reproducibly synthesized, having a well-defined topology and pore dimensions with low polydispersity (this being a characteristic of liquid crystalline $L_3$ phases). However to ensure that the integrity of the phase was unaffected upon silification, small-angle x-ray studies were performed. This allowed determination of the characteristic repeat distance of the $L_3$ phase to be obtained (an average over the thickness of the bilayer plus the channel occupied by solvent).

Figure 3:
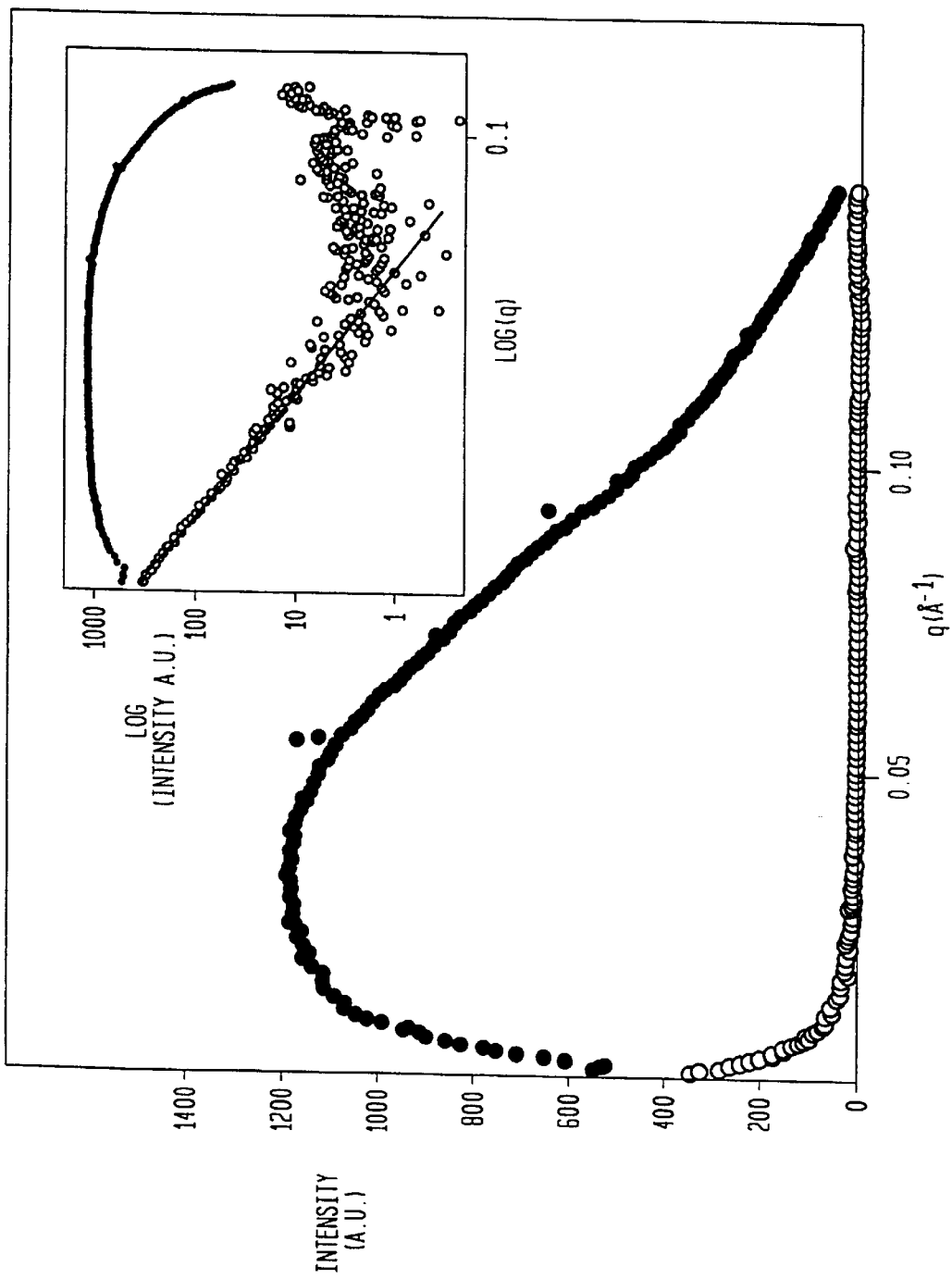
FIG. 3 is a one dimensional powder pattern of a silicate $L_3$, • (55 wt % sample with characteristic spacing 130 Å), amphiphilic $L_3$, ∆ (80 wt % sample with characteristic spacing 153 Å, note that the concentration of this sample is close to the concentration of the $L_3$ silicate also shown in this FIG. 3, taking into account the dilution factor arising from the addition of alkoxysilane and the subsequent methanol production (FIG. 2) and a xerogel, O. The silicate $L_3$ and amphiphilic $L_3$ patterns have been normalized to each other for ease of comparison. The inset shows the corresponding log log plot from which the azimuthal behavior may be determined. For the xerogel the intensity falls of as $q^{-3.8}$ and the amphiphilic $L_3$ as $q^{-1.8}$. The high-q asymptote for the $L_3$ could not be determined because of the limited q-range of the data.

FIG. 3 shows the one-dimensional diffraction patterns for a liquid crystalline $L_3$ phase and a silicated $L_3$ phase. Both show a broad band diffraction peak, which is superimposed upon a large wide ranging small-angle scattering. The broadness of the peak is in part due to the random pore structure; that is, it results from the ensemble average of chord lengths that vary in size because they strike across the pores at random. A characteristic spacing for the phase may be obtained via a tangential base line method. The limiting dependence of the intensity as a function of the reciprocal lattice vector may be used to determine the spectral dimension of the clusters, which is the parameter required to specify the fractal network dynamics, as such it is often called the fractal dimension (i.e. the intensity decreases as $I \propto q^{-D}$, assuming monodispersity of both particles and clusters [J. Teixeira in "On growth and form" ed. H. E. Stanley and N. Ostrowshy (Nijhoff, Dordrecht, 1986), p. 145)]. A relation between the power-law exponent and the fractal dimension can only be given if the cluster size distribution obeys a power-law (J. E. Martin, J. Appl. Cryst. 19 (1986) 25) and the aggregates are self-similar (D. W. Schaefer, Science 243 (1989) 1023) (such as is the case for the $L_3$ phase).

The inset to FIG. 3 shows the double-logarithmic representation of the one-dimensional scattering patterns. The characteristics of the diffraction pattern can be related to the different structural features correlated with the respective length scale. At the lowest q values, the scattered intensity is constant since at the corresponding large length scales, scattering does not allow resolution of the inhomogeneities of the sample. The intermediate dependence can be explained in terms of fractals. Smooth surfaces (e.g. colloidal aggregates, such as those in aerogels and xerogels) decay as $q^{-4}$ following Porod's law, whereas bilayer structures as in the case of the liquid crystalline $L_3$ phase (and lamellar phases) follow a $q^{-2}$ dependence. The liquid crystalline $L_3$ phase (a 55 wt % sample) has a limiting behavior dependence of $q^{-1.8}$, which within experimental uncertainty correlates with a local bilayer structure as expected. If the silicated $L_3$ phase is to conform to the topology of a liquid crystalline $L_3$ phase it too must show this asymptotic behavior. Due to the increased broadness, reduced intensity and long tail of the diffraction peak of the silicated $L_3$ phases, determining the true asymptotic behavior was hindered by the experimental limit of our diffraction camera. However, all indications lead to a limiting behavior of $q^{-2}$ rather than $q^{-4}$ as observed in aerogels and xerogels. Indeed, FIG. 3 shows the small-angle diffraction data for a silicate gel formed via traditional methods with no added surfactant; no peak is apparent and the limiting behavior decays as $q^{-3.8}$, as expected for a cross-linked colloidal structure.

In order to analyze the diffraction data in a reproducible and quantitative manner the volume fraction of solvent must be known. Liquid crystalline $L_3$ phases, upon dilution, follow a universal scaling law. Such systems are termed self-similar—appearing identical on all length scales. The universal scaling law for the $L_3$ phase of the presilicated samples is shown graphically in FIG. 4. For a system to follow a universal scaling law the topological form of the phase must remain unchanged upon dilution (i.e. pure swelling alone occurs) and the characteristic distance, therefore increases linearly as a function of the reciprocal of the solvent volume fraction. Hence addition/reduction of solvent merely results in a change in the characteristic repeat distance, given the restriction that the variation in the volume fraction of the solvent does not extend past the phase boundaries. For the $L_3$ phase studied here these correspond to volume fractions between ~53 and >99 wt % solvent.

Figure 4A:
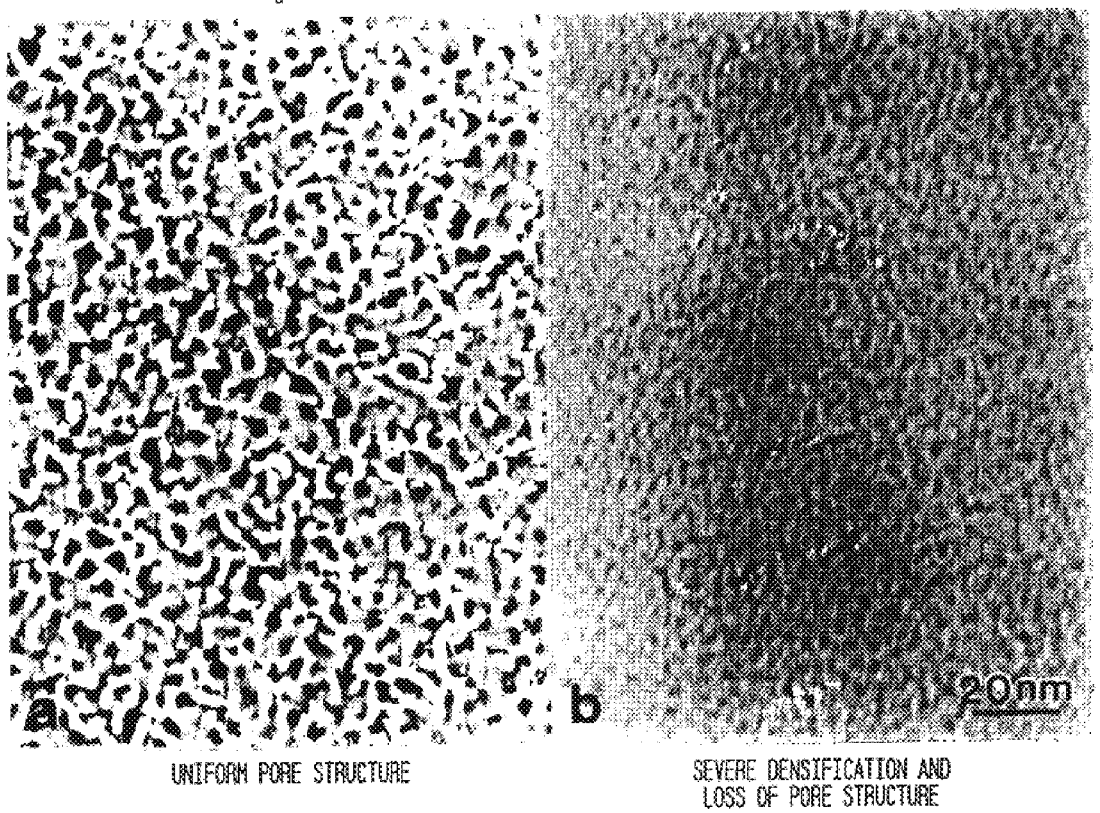
FIG. 4A are TEM micrographs of (a) a 55 wt % silicate $L_3$ and (b) xerogel of comparable density. The xerogel does not have much structure. It is very dense and the pores are very small. The micrographs were obtained in a Philips CM 200 Field-Emission-Gun TEM operated at 120 keV. The TEM images were acquired at both ambient and liquid nitrogen temperature, no visible variations in crystal structure were found at the two temperatures.
Figure 4B:
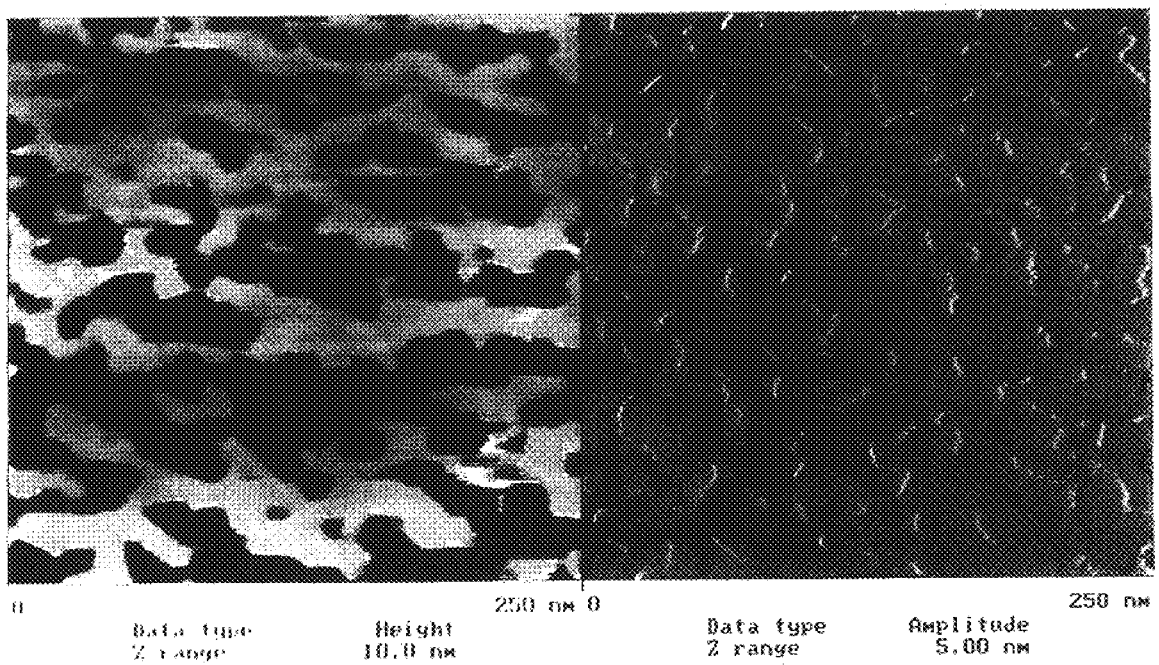
FIG. 4B are atomic force microscopy (AFM) pictures of a thin film of the structures of this invention. These pictures confirm the pore structure of the compositions of this invention. The light regions are the silica walls and the dark regions are the pores.
Figure 4D:
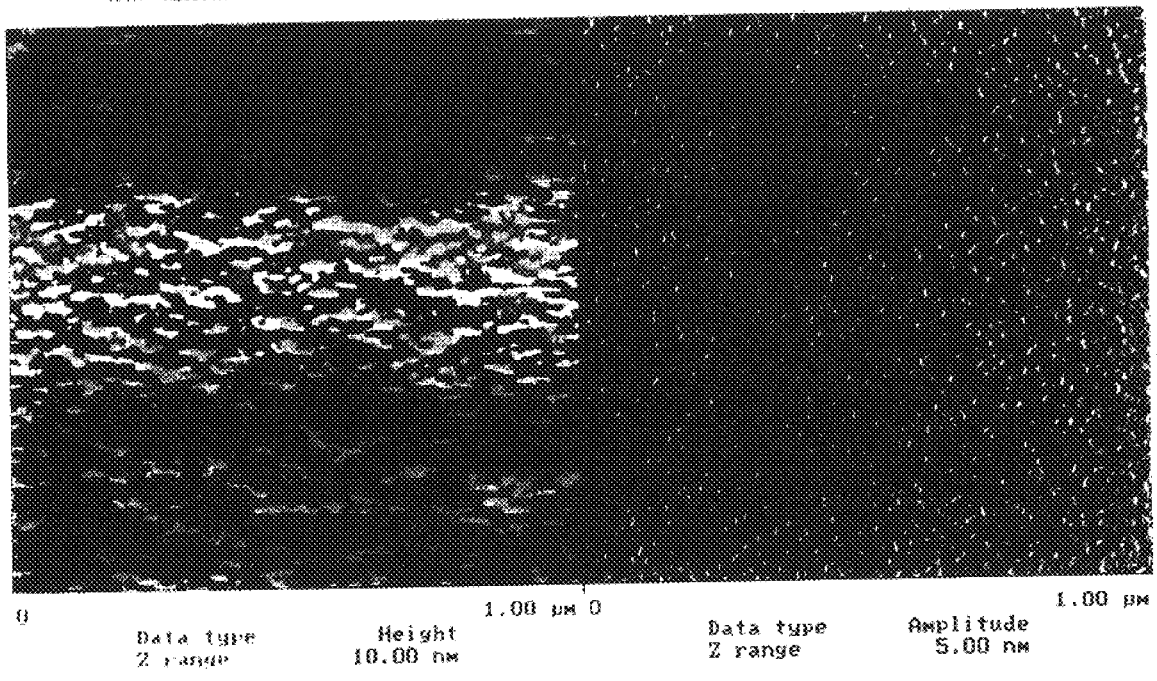
FIG. 4D are atomic force microscopy (AFM) pictures of a thin film of the structures of this invention. The magnifications are lower than that depicted in FIG. 4B.

Analysis of the silicated $L_3$ phases was complicated by the large increase in volume fraction upon addition of the silicate precursor and also due to shrinkage (reduction of the solvent volume fraction) subsequent to gelation and drying. Assuming no shrinkage occurs an upper volume fraction limit may be determined from the densities of the TMOS (added precursor) and methanol (byproduct). Characteristic repeat distances were found to decrease depending on the extent of shrinkage. All attempts were made to ensure that samples were treated in an identical manner in order to limit variations in shrinkage and therefore volume fraction. Shrinkage could be limited significantly (although not obliterated completely) by taking precautions during synthesis once a gel had been formed (sample would no longer flow, but condensation had not progressed sufficiently for a solid to have formed). As explained previously, solvent exchange could be used to prevent any significant shrinkage from occurring until the polymerization was complete. X-ray data obtained at this point produced characteristic distances, which corresponded to limiting volume fractions. The characteristic distances obtained in this fashion are shown in FIG. 4.

Once the universal scaling law had been obtained it was possible to determine the extent of shrinkage, since the so obtained curve could be used as a calibration curve. This follows as shrinkage in effect has the consequence of concentration of the phase only (i.e. a reduction of the solvent volume fraction). As shrinkage occurs, cracking is also necessary as the walls of the phase are now amorphous silica with a high rigidity modulus and shrinkage will therefore shatter the sample. In addition to a maximum volume fraction due to aqueous HCl, silicate, methanol appropriate for the sample. A minimum volume fraction corresponding to the total shrinkage (i.e. shrinkage occurs proportionally with solvent removal) is also possible depending on the drying mechanism followed and the extent of condensation when drying was instigated. A minimum diffraction peak corresponding to a repeat distance of ~4.5 nm was often obtained for all original volume fractions used which correlated to the surfactant bilayer and the polymerized silica alone.

Uses

A use for the materials of this invention is as a sensor material. One of the advantages of the mesoporous materials, i.e., materials having pore diameters of from 10–100 nanometers (the wavelength of visible light being as little 300 nanometers), is that the wavelength of incident light will not scatter appreciably so that the material will appear optically clear. As the pore size increases, approaching the size of visible light, the material will start to scatter the light and it will appear cloudy or colored. In the situation when the material does not scatter light, the material is a low index optical material. This means that when you put a coating on the material, e.g., a light or radiation sensitive material, the mesopore material does not contribute to any loss of signal.

Another use for the materials of this invention is for controlled filtration. Zeolites are used to filter small molecules but they are not useful for the filtration of larger molecules, such as proteins, because the proteins clog the zeolite. However, a mesopore has the appropriate pore size range to filter out proteins. Thus these materials are useful for the selective filtration of large molecules, polymers, biopolymers and similar type compositions.

Still another use for the materials of this invention is for the growth of nanocomposites. A nanocomposite is a material that has nanosize structures, i.e., a structure having pore sizes from 10–100 nanometers. One hundred nanometers is a tenth of micrometer. A structure having a pore size grater than 100 nanometers is considered a microstructure. The structures of this invention permit the building of yet smaller structures within the material. For example, there are potential applications for use in producing magnetic medium by putting extremely small ferro magnetic domains within a matrix. This could decrease the area that you need for data storage. Additionally, strong but still transparent, optical materials can be made for a whole host of applications. Photo optic or photo active materials at the nanoscale can also be produced, permitting the production of more effective optical filters, for example, improved infrared windows.

The compositions of this invention may also be used traps for large molecules, such as proteins, catalysts and catalyst supports. Most catalysts work by having a molecule temporarily absorbed onto the surface. Such absorption renders it more chemically active. The larger surface area combined with the more uniform pore distribution makes the compositions of this invention more advantageous than aerogels.

The compositions can also be used as temperature insulators and selective liquid barriers that allow you to filter out large quantities of liquids. For example, the composition may be used as a prefilter in a waste water treatment plant to get out large quantities of organics before you go into a smaller ones. Such use of the composition prevents clogging of smaller porous filters.

The compositions may also be used as osmotic membranes. An osmotic membrane relies on the difference in the chemical potential between two liquids of different concentrations separated by a barrier. The chemical potential creates a pressure and if you have a porous membrane between the two liquids, the pressure forces some constituents through the membrane while the other constituents are trapped behind the membrane. Other uses for the compositions could be in dialysis.

The compositions may also be used with vanadium pentoxide, compositions that are useful for energy storage and for stabilizing lithium. Most batteries are made of a plurality of very thin layers of a conductive layer and a storage layer. Mesoporous materials have interconnected pathways that have large connected areas for an energy storage phase and a conductive phase intermixed within a a high surface area. The high surface area of the mesoporous materials can be used with titanium dioxide in ultra capacitor applications. The ultra capacitors hold a lot of energy which can be released in a very short amount of time for a specific application.

Additional applications of the materials of the present invention include low index optical material, controlled filtration, growth of nano-composites, traps for large molecules, e.g., proteins, catalysts and catalyst supports, insulation, selective liquid barriers, osmotic membranes, $V_2O_5$ for energy storage, $TiO_2$ for ultracapacitors, activated surfaces for heavy metal isolation and removal, and silver ion reduction.

In the case of nanocomposites, the precipitation of a second phase within the pore network as nanometer-scale particles or aggregates of particles. The second phase can be ceramic, metal, or polymer. Such systems would be useful for catalysts (such as platinum or gold particles on a silica surface) or in optoelectronic applications (metal nanoparticles in suspension give a deep rich color to materials that is decorative such as ruby glass but also finds use as optical filters, waveguides, and so forth.

Having thus described the invention in detail, it is to be understood that the foregoing description is not intended to limit the spirit and scope thereof. What is desired to be protected by Letters Patent is set forth in the appended claims.

What is claimed is:

1. A mesoporous ceramic fiber having a pore size diameter in the range of about 10–100 nanometers produced by templating with a ceramic precursor a lyotropic liquid crystalline $L_3$ phase, wherein the $L_3$ phase consists of a three-dimensional, random, nonperiodic network packing of a multiple connected continuous membrane.

2. The material of claim 1, wherein the ceramic precursor is a metalloorganic or metal salt precursor to oxide or non-oxide ceramics.

3. The material of claim 2, wherein the ceramic precursor is tetramethoxysilane (TMOS) or tetraethoxysilane (TEOS).

4. The material of claim 2, wherein the ceramic precursor is a salt or alkoxide of titanium.

5. The material of claim 2, wherein the ceramic precursor is a salt or alkoxide of vanadium.

* * * * *